United States Patent Office 3,511,017
Patented May 12, 1970

3,511,017
FOAMABLE CAPSULES
Leslie H. Breden, Ellicott City, Md., assignor to W. R. Grace & Co., New York, N.Y., a corporation of Connecticut
No Drawing. Filed Mar. 1, 1968, Ser. No. 709,817
Int. Cl. B65b 55/20, 51/02; B32b 5/18
U.S. Cl. 53—33                                 2 Claims

ABSTRACT OF THE DISCLOSURE

Delicate articles are encapsulated in foam. Articles are covered with a film of polyvinyl chloride impregnated with ethylidene dichloride and then are heated to above 250° F. Foam, which completely encloses the article, is formed by heating. A foamed protective barrier resistant to water, moisture-vapor, gas, and having good thermal insulating properties results.

---

This invention is concerned with the packaging and encapsulating of objects with foamable film.

There are many instances where small, delicate parts can be damaged even during preliminaries of assembling into larger units. A foam protection of the part which insulates it from damage up to the moment of assembly is very desirable.

Foamed coverings are useful also for spare parts.

The coverings which are produced by this invention not only give mechanical protection but are gas and moisture barriers which preserve the spare parts for as long a time as may be required.

Briefly, the packaging and encapsulating material is a polyvinyl chloride film made foamable when the film is heated by first soaking the film for a substantial time in ethylidene dichloride. The parts may be laid on the film, which then is loosely folded over, and thereafter is heated to produce a foam enclosure. This procedure affords good mechanical protection.

However, for permanent storage, pouches are made and swollen in the ethylidene dichloride. The material to be protected is then placed in the pouch, the open edge of the pouch is heat sealed, and the package is foamed, and surrounds the object, no matter what its shape may be, with a foam envelope from 200 to 800% thicker than the dry polyvinyl chloride film.

Eethylidene dichloride swells normal polyvinyl chloride film. As an example, an 11-mil film, after soaking for 12 hours in ethylidene dichloride, will become about 21 mils thick. But this swelling agent has a particular advantage. It does not soften the polyvinyl film unduly. The film is slightly plasticized, but remains easy to handle. The ethylidene dichloride vaporizes uniformly and creates a closed cell foam which can be as much as 800% thicker than the original film. Surprisingly, it is not necessary to enclose the packaged article in a chamber which surrounds it and limits the expansion, to prevent blow-outs. The swollen polyvinyl chloride film may be heated in an open oven, and, with properly chosen temperatures, blow-outs will not occur.

Because a closed-pore structure is a result, the encapsulated parts are sealed within a foam package which is shock absorbing and highly moisture, vapor, water, and gas proof. The foams are thick enough to act as effective thermo insulators.

Since it is possible to make the foams bulky enough to give substantial thermo insulation, components which should not be subjected to rapid changes in temperature can be easily protected by thick foamed insulation.

EXAMPLE 1

A sheet of polyvinyl chloride, 11 mils in thickness, was soaked for 12 hours at 73° F. in ethylidene dichloride. At the end of 12 hours, the sheet had swollen to 21 mils in thickness and was somewhat plasticized. Such sheets were formed into bags or "pouches" and various small mechanical parts were placed in them, and the pouches heat sealed.

After the parts had been placed in the bags, the bags were heated in an oven at temperatures varying from 250 to 300° F. All pouches were converted into thick foam deposits. Depending on the shape of the part, the foams varied in thickness from ¼ of an inch to ⅒ of an inch.

No attempt was made to subject the packaged parts to drop tests since the encapsulation of an individual part is not supposed to give full protection in freight handling. But each packaged part was well protected against whatever handling it might receive in a factory prior to assembly.

Obviously, the utility of the invention is not limited to parts. Complete assemblies can be protected as well.

Although the invention has been disclosed using a film of polyvinyl chloride homopolymer, it is obvious that copolymers containing 80% polyvinyl chloride are also operable in the instant invention. Monomers copolymerizable with vinyl chloride and operable in the instant invention include, but are not limited to vinylidene chloride, vinyl acetate, acrylates and substituted acrylate and alpha-olefins or mixtures thereof wherein said comonomers are present in the resulting copolymer in an amount not in excess of 20%.

What is claimed is:

1. The method of packaging an article in a protective covering which includes sealingly enclosing the article in a swollen film comprising ethylidene dichloride and a member of the group consisting of polyvinyl chloride and copolymers of vinyl chloride with vinyl acetate, acrylates, substituted acrylates, vinylidene chloride and alpha-olefins or mixtures thereof, wherein within said copolymers the vinyl chloride is present in an amount equal to at least 80% of the copolymer, and then heating the package at a temperature of between 250 and 300° F. to vaporize the ethylidene dichloride and thereby convert the group member into a closed pore foam covering having a thickness of from 200 and 800% that of the dry film of said group member.

2. The method of packaging an article in a protective covering which includes soaking a pouch formed from a film of a member of the group consisting of polyvinyl chloride and copolymers of vinyl chloride with vinyl acetate, acrylates, substituted acrylates, vinylidene chloride and alpha-olefins or mixtures thereof, wherein within said copolymers the vinyl chloride is present in an amount equal to at least 80% of the copolymer, in the ethylidene dichloride until the wall of said pouch has approximately doubled in thickness, placing an article to be protected in said swollen pouch, sealing the pouch, and then heating the package to between 250 and 300° F. and permitting the package to cool, whereby a closed pore foam covering completely enclosing the article is formed.

References Cited

UNITED STATES PATENTS

| | | | |
|---|---|---|---|
| 2,897,641 | 8/1959 | Simon | 53—27 |
| 2,959,508 | 11/1960 | Graham | 156—78 X |
| 2,979,246 | 4/1961 | Liebeskind | 156—78 X |
| 2,985,287 | 5/1961 | Schulz | 156—78 X |
| 3,039,245 | 6/1962 | Jones | 53—27 X |
| 3,193,426 | 7/1965 | Schafer | 53—27 X |
| 3,222,843 | 12/1965 | Schneider | 53—27 |
| 3,419,455 | 12/1968 | Roberts | 53—78 X |

WAYNE A. MORSE, JR., Primary Examiner

U.S. Cl. X.R.

53—21, 27; 156—78, 83, 305